US012661699B1

(12) United States Patent
Thrasher

(10) Patent No.: US 12,661,699 B1
(45) Date of Patent: Jun. 23, 2026

(54) GREASE HOOD ABATEMENT SYSTEM

(71) Applicant: Derek Thrasher, Warrior, AL (US)

(72) Inventor: Derek Thrasher, Warrior, AL (US)

( * ) Notice: Subject to any disclaimer, the term of this patent is extended or adjusted under 35 U.S.C. 154(b) by 214 days.

(21) Appl. No.: 18/663,217

(22) Filed: May 14, 2024

(51) Int. Cl.

| | |
|---|---|
| ***B08B 17/02*** | (2006.01) |
| ***B05B 7/00*** | (2006.01) |
| ***C11D 3/386*** | (2006.01) |
| ***F24C 15/20*** | (2006.01) |

(52) U.S. Cl.
CPC ................ *B08B 17/02* (2013.01); *B05B 7/00* (2013.01); *C11D 3/386* (2013.01); *F24C 15/20* (2013.01)

(58) Field of Classification Search
CPC . B08B 17/02; B05B 7/00; C11D 3/386; F24C 15/20
See application file for complete search history.

(56) References Cited

U.S. PATENT DOCUMENTS

| | | | | |
|---|---|---|---|---|
| 3,248,858 A | | 5/1966 | Toke | |
| 3,490,206 A | * | 1/1970 | De Witt | F24C 15/20 55/467 |
| 3,494,108 A | * | 2/1970 | Moragne | F24C 15/20 55/DIG. 36 |
| 3,564,989 A | * | 2/1971 | Williams | G08B 17/06 454/67 |
| 3,795,181 A | * | 3/1974 | Lawson | F23J 3/026 134/115 R |
| 3,805,685 A | * | 4/1974 | Carns | F24C 15/20 96/228 |
| 3,815,625 A | | 6/1974 | Weise | |
| 4,050,446 A | * | 9/1977 | Giuffre | F24C 15/20 55/DIG. 36 |
| 4,066,064 A | * | 1/1978 | Vandas | F24C 15/2057 55/467 |
| 4,085,735 A | * | 4/1978 | Kaufman | A62C 3/006 169/65 |
| 4,259,945 A | * | 4/1981 | Lawson | B01D 47/06 134/115 R |
| 4,784,114 A | * | 11/1988 | Muckler | F24C 15/20 126/299 R |
| 5,042,457 A | * | 8/1991 | Gallagher | F24C 15/20 55/DIG. 36 |
| 5,235,963 A | * | 8/1993 | Strause | B08B 9/0433 134/167 C |

(Continued)

FOREIGN PATENT DOCUMENTS

| | | | | |
|---|---|---|---|---|
| AU | 3372500 A | * | 9/2000 | F24C 15/20 |
| CA | 2381721 | | 1/2009 | |
| WO | WO-9518943 A2 | * | 7/1995 | F24C 15/20 |

*Primary Examiner* — Benjamin L Osterhout
(74) *Attorney, Agent, or Firm* — Kyle A. Fletcher, Esq.

(57) ABSTRACT

The grease hood abatement system includes a plurality of fogger nozzles, a plurality of supply lines, a pump, a container, and a control box. The plurality of fogger nozzles 00 may be coupled to a hood located over a cooking appliance. The control box may energize the pump to dispense a degreasing enzyme solution as a mist via the plurality of fogger nozzles and the plurality of supply lines. The plurality of fogger nozzles may be distributed over the hood such that nozzle apertures are located inside of the hood and the distance between the plurality of fogger nozzles provides maximum coverage of the mist onto interior surfaces of the hood. The degreasing enzyme solution deposited on the hood may inhibit grease from sticking to the hood.

19 Claims, 3 Drawing Sheets

(56) References Cited

U.S. PATENT DOCUMENTS

| | | | | | |
|---|---|---|---|---|---|
| 5,469,837 | A * | 11/1995 | Chiang | F24C 15/20 | 126/299 R |
| 5,537,988 | A * | 7/1996 | Lin | F24C 15/20 | 126/299 R |
| 5,860,412 | A * | 1/1999 | Way | F24C 15/20 | 96/228 |
| 5,874,292 | A * | 2/1999 | McMinn, Jr. | B08B 9/0327 | 126/299 F |
| 6,079,502 | A * | 6/2000 | Davis | A62C 37/40 | 169/61 |
| 6,651,648 | B2 * | 11/2003 | Kuang | F24C 15/2021 | 126/299 R |
| 6,662,800 | B2 * | 12/2003 | Yeung | F24C 15/20 | 55/DIG. 36 |
| 6,712,068 | B1 * | 3/2004 | Yeung | F24C 15/2057 | 55/DIG. 36 |
| 6,895,957 | B2 * | 5/2005 | Yeung | F24C 15/2057 | 55/DIG. 36 |
| 7,197,788 | B2 | 4/2007 | Yeung | | |
| 7,273,049 | B2 | 9/2007 | Yeung | | |
| D635,234 | S | 3/2011 | Gauthier | | |
| 7,963,282 | B2 | 6/2011 | Griffin | | |
| 8,323,389 | B2 * | 12/2012 | Brookman | B01D 47/021 | 96/267 |
| 10,195,470 | B2 * | 2/2019 | Livchak | F24C 15/2021 | |
| 10,767,871 | B2 * | 9/2020 | Budich | F24C 14/005 | |
| 11,156,368 | B2 * | 10/2021 | Lambertson | F24C 15/20 | |
| 11,897,004 | B2 * | 2/2024 | Haugen | B08B 3/02 | |
| 12,453,988 | B2 * | 10/2025 | Haugen | B08B 3/02 | |
| 2002/0028501 | A1 * | 3/2002 | McMinn, Jr. | B08B 9/0327 | 435/264 |
| 2003/0101987 | A1 * | 6/2003 | Kuang | F24C 15/2021 | 126/299 R |
| 2004/0206347 | A1 * | 10/2004 | Gallagher | F24C 15/20 | 126/299 E |
| 2005/0016523 | A1 * | 1/2005 | Yeung | F24C 15/2057 | 126/299 E |
| 2005/0178378 | A1 * | 8/2005 | Marshall | F24C 15/2057 | 126/299 R |
| 2005/0178411 | A1 | 8/2005 | Fu | | |
| 2007/0209655 | A1 * | 9/2007 | Kellogg | F24C 15/2057 | 126/299 E |
| 2021/0080117 | A1 * | 3/2021 | Creech | F24C 15/2057 | |
| 2022/0324000 | A1 * | 10/2022 | Shingler | B08B 3/02 | |

* cited by examiner

GREASE HOOD ABATEMENT SYSTEM

CROSS REFERENCE TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

FIELD OF THE INVENTION

The present invention relates to the fields of vent hoods, and grease abatement systems, more specifically, a grease hood abatement system.

SUMMARY OF INVENTION

The grease hood abatement system may comprise a plurality of fogger nozzles, a plurality of supply lines, a pump, a container, and a control box. The plurality of fogger nozzles 00 may be coupled to a hood located over a cooking appliance. The control box may energize the pump to dispense a degreasing enzyme solution as a mist via the plurality of fogger nozzles and the plurality of supply lines. The plurality of fogger nozzles may be distributed over the hood such that nozzle apertures are located inside of the hood and the distance between the plurality of fogger nozzles provides maximum coverage of the mist onto interior surfaces of the hood. The degreasing enzyme solution deposited on the hood may inhibit grease from sticking to the hood.

An object of the invention is to provide a plurality of fogger nozzles that may be coupled to a hood and interconnect via a plurality of supply lines.

Another object of the invention is to provide a container that may be filled with a degreasing enzyme solution, A further object of the invention is to provide a pump that may pump the degreasing enzyme solution from the container to the plurality of fogger nozzles via a feeder line and the plurality of supply lines.

Yet another object of the invention is to provide a control box that may energize and de-energize the pump responsive to manual user inputs and/or a programmed schedule.

These together with additional objects, features and advantages of the grease hood abatement system will be readily apparent to those of ordinary skill in the art upon reading the following detailed description of the presently preferred, but nonetheless illustrative, embodiments when taken in conjunction with the accompanying drawings.

In this respect, before explaining the current embodiments of the grease hood abatement system in detail, it is to be understood that the grease hood abatement system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grease hood abatement system.

It is therefore important that the claims be regarded as including such equivalent construction insofar as they do not depart from the spirit and scope of the grease hood abatement system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
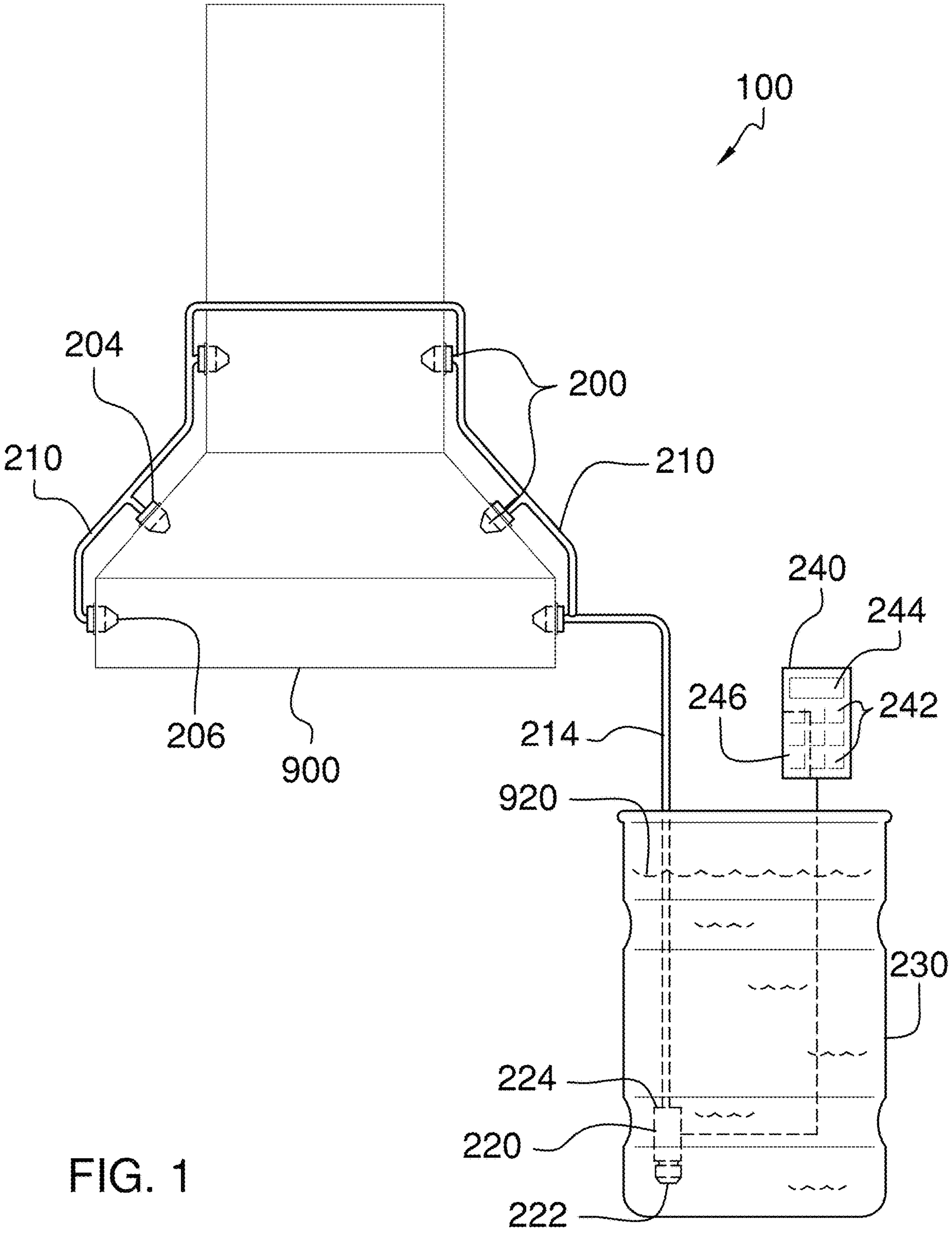
FIG. 1 is a front view of an embodiment of the disclosure.
Figure 2:
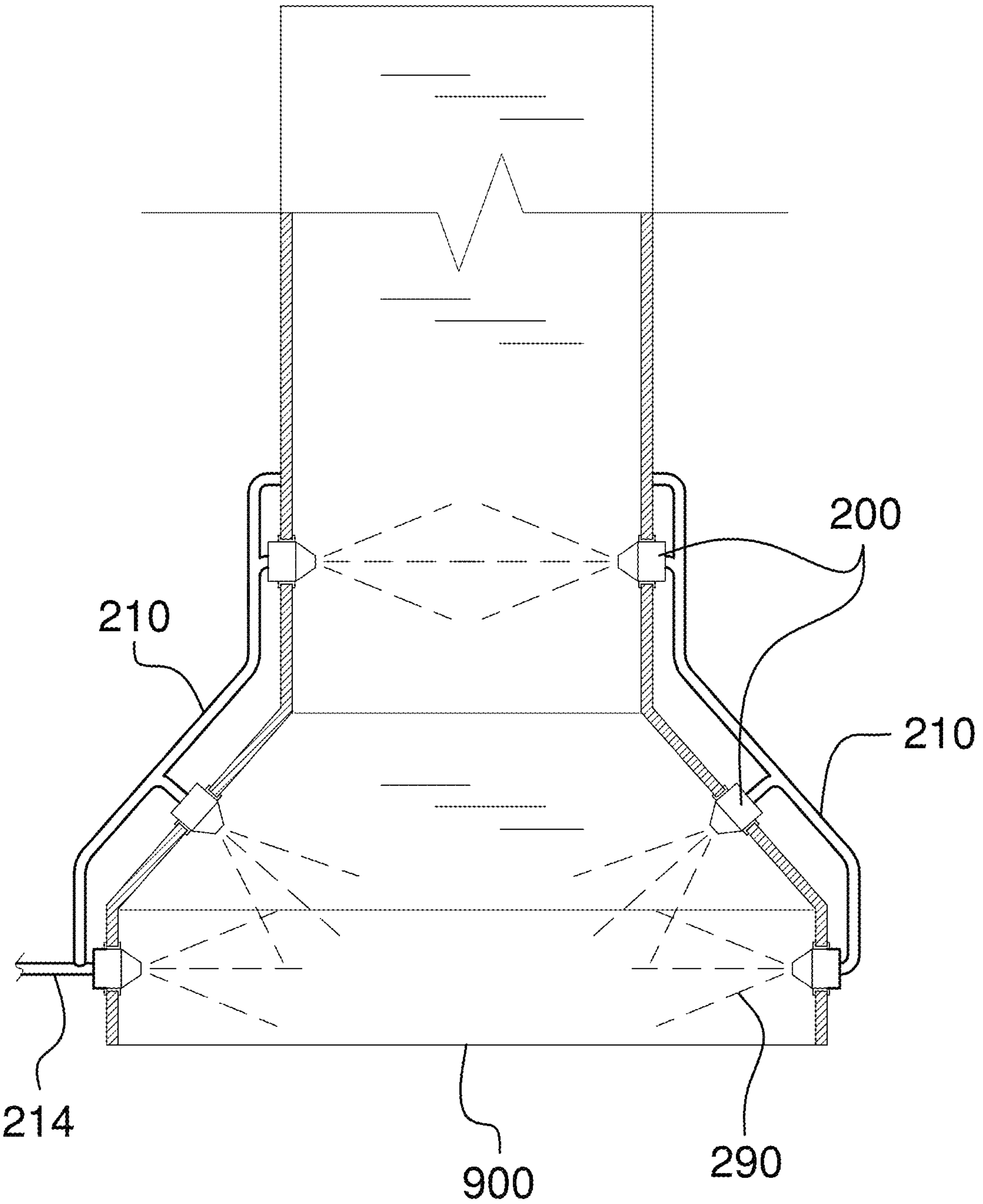
FIG. 2 is a rear detail view of an embodiment of the disclosure.
Figure 3:
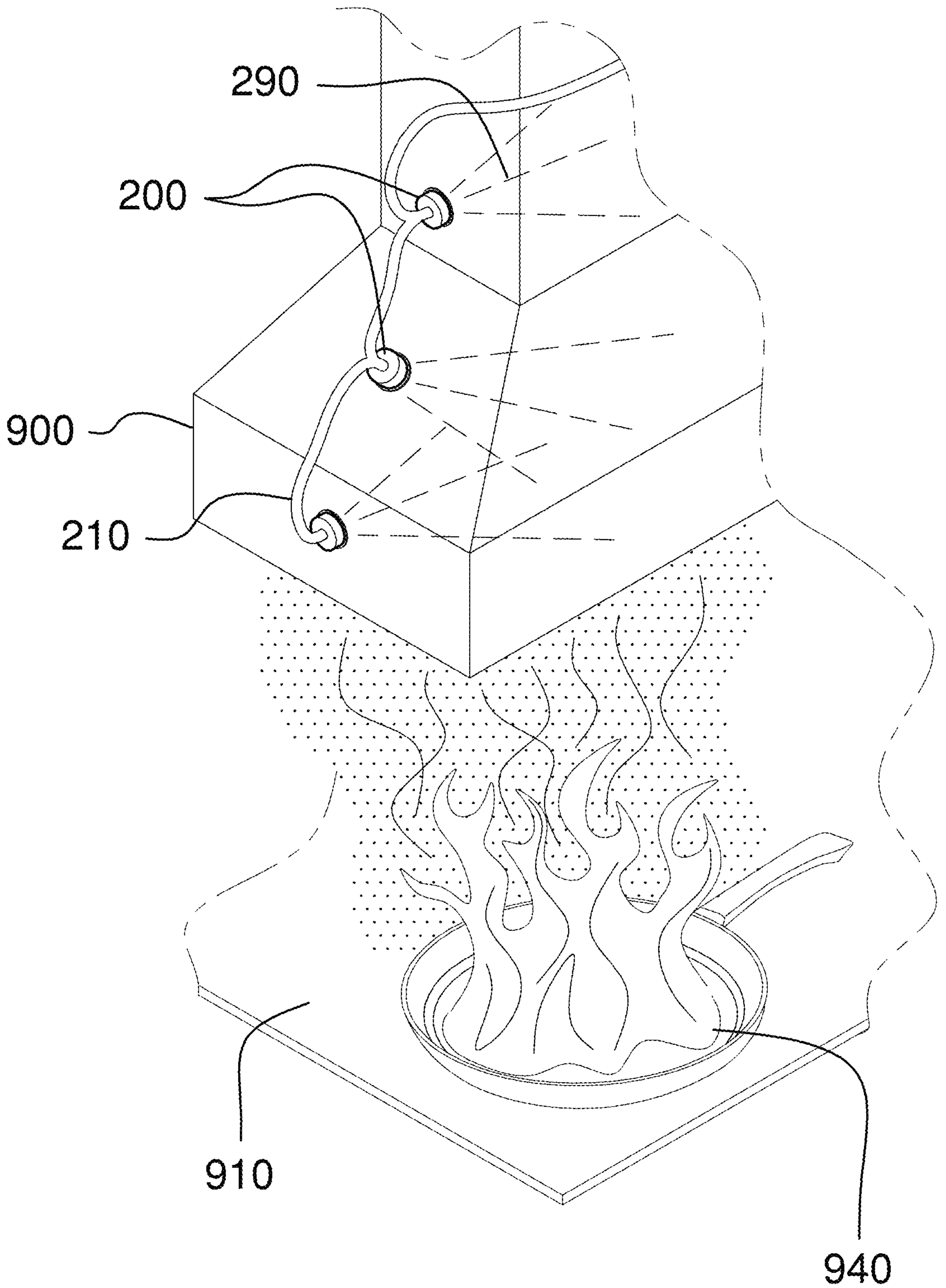
FIG. 3 is an in-use view of an embodiment of the disclosure.

Detailed reference will now be made to a first potential embodiment of the disclosure, which is illustrated in FIGS. 1 through 3.

The grease hood abatement system 100 (hereinafter invention) comprises a plurality of fogger nozzles 200, a plurality of supply lines 210, a pump 220, a container 230, and a control box 240. The plurality of fogger nozzles 200 may be coupled to a hood 900 located over a cooking appliance 910. The control box 240 may energize the pump 220 to dispense a degreasing enzyme solution 920 as a mist 290 via the plurality of fogger nozzles 200 and the plurality of supply lines 210. The plurality of fogger nozzles 200 may be distributed over the hood such that nozzle apertures 206 are located inside of the hood 900 and the distance between the plurality of fogger nozzles 200 provides maximum coverage of the mist 290 onto interior surfaces of the hood 900. The degreasing enzyme solution 920 deposited on the hood 900 may inhibit grease from sticking to the hood 900.

The plurality of fogger nozzles 200 may be coupled to the hood 900 such that the nozzle apertures 206 are located inside of the hood 900 and the plurality of supply lines 210 may be coupled to the plurality of fogger nozzles 200 on the outside of the hood 900. An individual fogger nozzle selected from the plurality of fogger nozzles 200 may dispense the mist 290 from the nozzle aperture 206 upon being pressurized by the degreasing enzyme solution 920 pumped through the plurality of supply lines 210. In some embodiments, the individual fogger nozzle may be coupled to the hood 900 via a grommet 204.

The plurality of supply lines 210 may provide the degreasing enzyme solution 920 to all of the plurality of fogger nozzles 200. The plurality of supply lines 210 may be fluidly coupled to the pump 220 via a feeder line 214.

The pump 220 may move the degreasing enzyme solution 920 from a pump inlet 222 to a pump outlet 224. The pump 220 may be electromechanical and may comprise an internal motor that may be energized by the application of a voltage to the pump 220. As non-limiting examples, the pump 220 may move the degreasing enzyme solution 920 by applying rotary motion, reciprocating motion, linear motion, or any combination thereof to one or more gears, screws, pistons, shuttle blocks, vanes, diaphragms, plungers, chains, ropes, impellers, or any combination thereof. The pump 220 may be submerged within the container 230 such that the pump inlet 222 is in fluid contact with the degreasing enzyme solution 920. The pump outlet 224 may be coupled to the feeder line 214.

The container 230 may be a storage reservoir for the degreasing enzyme solution 920. The degreasing enzyme solution 920 may be pumped out of the container 230 by the pump 220 such that the degreasing enzyme solution 920 may reach the plurality of fogger nozzles 200 via the feeder line 214 and the plurality of supply lines 210. The container 230 may be refillable.

The control box 240 may control operation of the pump 220 by energizing and de-energizing the pump 220. The control box 240 may comprise a plurality of operator controls 242 and one or more operator indicators 244. The control box 240 may be adapted to accept input from a user via the plurality of operator controls 242 and may display status information, error messages, instructions, or any combination thereof via the one or more operator indicators 244. In some embodiments, the one or more operator indicators 244 may comprise a textual display which may display textual messages.

In some embodiments, the control box 240 may comprise a timer 246 such that the control box 240 may energize and de-energize the pump 220 for specific intervals, durations, schedules, or any combination thereof.

As non-limiting examples, the control box 240 may be adapted to energize and de-energize the pump 220 in response to manual input by the user on the plurality of operator controls 242, may energize the pump 220 to run for an interval selected by the user, may periodically energize and de-energize the pump 220 during a pre-planned maintenance schedule, or any combination thereof.

In some embodiments, the invention 100 may be operable to suppress a fire 940. As a non-limiting example, the pump 220 may be activated to dispense a non-flammable degreasing enzyme solution, water from a water supply line, or a combination thereof in order to douse the fire 940 located on the cooking appliance 910 and/or within the hood 900. As non-limiting examples, the pump 220 may be adapted to be energized to douse the fire 940 responsive to manual intervention of the user, responsive to input to the control box 240 from a heat sensor, or any combination thereof.

In use, a plurality of fogger nozzles 200 may be coupled to a hood 900. The plurality of fogger nozzles 200 may be distributed over the hood 900 such that the mist 290 sprayed from the plurality of fogger nozzles 200 may maximally cover the interior of the hood 900. A feeder line 214 may be used to couple a pump 220 to a plurality of supply lines 210 for the plurality of fogger nozzles 200. A container 230 may be filled with a degreasing enzyme solution 920 and the pump 220 may be immersed in the container 230. The pump 220 may also be coupled to a control box 240 such that the control box 240 may energize and de-energize the pump 220. Responsive to manual action from the user via the plurality of operator controls 242 or responsive to a timed event tracked by the control box 240, the pump 220 may be energized to spray the degreasing enzyme solution 920 on the interior of the hood 900. The degreasing enzyme solution 920 may inhibit grease from sticking to the interior of the hood 900 and/or may make cleaning the hood 900 easier.

DEFINITIONS

As used in this disclosure, an "aperture" may be an opening in a surface or object. Aperture may be synonymous with hole, slit, crack, gap, slot, or opening.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used herein, "hood" may refer to an appliance mounted above a grill or range to capture, filter, and vent cooking grease and steam. A hood may comprise an integrated fan and/or lights that illuminate the grill or range below.

As used in this disclosure, the word "interior" may be used as a relational term that implies that an object is located or contained within the boundary of a structure or a space.

As used in this disclosure, a "motor" may refer to a device that transforms energy from an external power source into mechanical energy.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used herein, "reservoir" may refer to a container or containment system that is configured to store a liquid, gas, or gel.

As used in this disclosure, a "sensor" may be a device that quantitatively measures a physical stimulus.

As used in this disclosure, a "spray" may be a plurality of liquid drops projected from a nozzle.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A grease hood abatement system comprising:

a plurality of fogger nozzles, a plurality of supply lines, a pump, a container, and a control box;

wherein the plurality of fogger nozzles are coupled to a hood located over a cooking appliance;

wherein the control box energizes the pump to dispense a degreasing enzyme solution as a mist via the plurality of fogger nozzles and the plurality of supply lines;

wherein the plurality of fogger nozzles are distributed over the hood such that nozzle apertures thereof are located inside of the hood in order to provide mist onto interior surfaces of the hood;

wherein the degreasing enzyme solution deposited on the hood inhibits grease from sticking to the hood.

2. The grease hood abatement system according to claim 1 wherein the plurality of fogger nozzles are coupled to the hood such that the nozzle apertures are located inside of the hood and the plurality of supply lines are coupled to the plurality of fogger nozzles on the outside of the hood.

3. The grease hood abatement system according to claim 2 wherein an individual fogger nozzle selected from the plurality of fogger nozzles dispenses the mist from the nozzle aperture upon being pressurized by the degreasing enzyme solution pumped through the plurality of supply lines.

4. The grease hood abatement system according to claim 3 wherein the individual fogger nozzle is coupled to the hood via a grommet.

5. The grease hood abatement system according to claim 3 wherein the plurality of supply lines provide the degreasing enzyme solution to all of the plurality of fogger nozzles;

wherein the plurality of supply lines are fluidly coupled to the pump via a feeder line.

6. The grease hood abatement system according to claim 5 wherein the pump moves the degreasing enzyme solution from a pump inlet to a pump outlet;

wherein the pump is electromechanical and comprises an internal motor that is energized by the application of a voltage to the pump.

7. The grease hood abatement system according to claim 6 wherein the pump moves the degreasing enzyme solution by applying rotary motion, reciprocating motion, linear motion, or any combination thereof to one or more gears, screws, pistons, shuttle blocks, vanes, diaphragms, plungers, chains, ropes, impellers, or any combination thereof.

8. The grease hood abatement system according to claim 6 wherein the pump is submerged within the container such that the pump inlet is in fluid contact with the degreasing enzyme solution.

9. The grease hood abatement system according to claim 8 wherein the pump outlet is coupled to the feeder line.

10. The grease hood abatement system according to claim 9 wherein the container is a storage reservoir for the degreasing enzyme solution;

wherein the degreasing enzyme solution is pumped out of the container by the pump such that the degreasing enzyme solution reaches the plurality of fogger nozzles via the feeder line and the plurality of supply lines.

11. The grease hood abatement system according to claim 10 wherein the container is refillable.

12. The grease hood abatement system according to claim 11 wherein the control box controls operation of the pump by energizing and de-energizing the pump.

13. The grease hood abatement system according to claim 12 wherein the control box comprises a plurality of operator controls and one or more operator indicators;

wherein the control box is adapted to accept input from a user via the plurality of operator controls and displays status information, error messages, instructions, or any combination thereof via the one or more operator indicators.

14. The grease hood abatement system according to claim 13 wherein the one or more operator indicators comprise a textual display which displays textual messages.

15. The grease hood abatement system according to claim 13 wherein the control box comprises a timer such that the control box energizes and de-energizes the pump for specific intervals, durations, schedules, or any combination thereof.

16. The grease hood abatement system according to claim 15 wherein the control box is adapted to energize and de-energize the pump in response to manual input by the user on the plurality of operator controls, energize the pump to run for an interval selected by the user, periodically energize and de-energize the pump during a pre-planned maintenance schedule, or any combination thereof.

17. The grease hood abatement system according to claim 16 wherein the grease hood abatement system is operable to suppress a fire.

18. The grease hood abatement system according to claim 17 wherein the pump is activated to dispense a non-flammable degreasing enzyme solution, water from a water supply line, or a combination thereof in order to douse the fire located on the cooking appliance and/or within the hood.

19. The grease hood abatement system according to claim 18 wherein the pump is adapted to be energized to douse the fire responsive to manual intervention of the user, responsive to input to the control box from a heat sensor, or any combination thereof.

* * * * *